(12) United States Patent
Dannhauer et al.

(10) Patent No.: US 7,363,811 B2
(45) Date of Patent: Apr. 29, 2008

(54) MEASUREMENT PICKUP

(75) Inventors: Wolfgang Dannhauer, Teltow (DE);
Ralf Nuernberger, Potsdam (DE);
Dietfried Burczyk, Teltow (DE);
Thiérry Moser, Sierentz (FR); Oliver Graf, Känorkinden (CH); Raphael Erni, Münchenstein (CH); Stefan Muth, Schopfheim (DE)

(73) Assignee: Endress + Hauser Flowtec AG, Reinach (CH)

( * ) Notice: Subject to any disclaimer, the term of this patent is extended or adjusted under 35 U.S.C. 154(b) by 38 days.

(21) Appl. No.: 11/100,552

(22) Filed: Apr. 7, 2005

(65) Prior Publication Data

US 2006/0225493 A1    Oct. 12, 2006

(51) Int. Cl.
*G01F 15/14*    (2006.01)
*G01F 15/10*    (2006.01)

(52) U.S. Cl. .......................................... 73/273; 73/861

(58) Field of Classification Search ........... 73/861.355, 73/861.356, 861.357, 272 R, 273, 274
See application file for complete search history.

(56) References Cited

U.S. PATENT DOCUMENTS

| | | | |
|---|---|---|---|
| 3,207,179 A | | 9/1965 | Klagues |
| 3,718,048 A | * | 2/1973 | Nolte ........................... 73/716 |
| 3,757,577 A | * | 9/1973 | Bozek ...................... 73/861.56 |
| 3,878,725 A | * | 4/1975 | Gaertner ....................... 73/701 |
| 4,135,408 A | * | 1/1979 | Di Giovanni ................ 73/721 |
| 4,308,754 A | * | 1/1982 | Pedersen et al. ......... 73/861.28 |
| 4,317,375 A | * | 3/1982 | Egert ....................... 73/861.55 |
| 4,347,744 A | * | 9/1982 | Buchanan ..................... 73/715 |
| 4,449,412 A | * | 5/1984 | Fallon et al. .................. 73/738 |
| 4,461,180 A | * | 7/1984 | Hellouin de Menibus .... 73/706 |
| 4,468,971 A | * | 9/1984 | Herzl et al. .............. 73/861.28 |
| 4,574,328 A | * | 3/1986 | Maier ......................... 361/284 |
| 4,594,584 A | * | 6/1986 | Pfeiffer et al. ............. 340/620 |
| 4,617,607 A | * | 10/1986 | Park et al. ................ 361/283.4 |
| 4,641,536 A | | 2/1987 | Jacobsen |
| 4,713,969 A | * | 12/1987 | Ishii ........................... 73/706 |

(Continued)

FOREIGN PATENT DOCUMENTS

DE    881 262    6/1953

(Continued)

OTHER PUBLICATIONS

Smith, Peter; Zappe, R.W. Valve Selection Handbook—Engineering Fundamentals for Selecting the Right Valve Design for Every Industrial Flow Application (5th Edition). (p. 284). Ó2004. Elsevier. Online version available at: http://www.knovel.com/knovel2/Toc.jsp?BookID=1270&VerticalID=0. Accessed on Aug. 14, 2006.*

*Primary Examiner*—Edward Lefkowitz
*Assistant Examiner*—Punam Patel
(74) *Attorney, Agent, or Firm*—Bacon & Thomas, PLLC

(57) ABSTRACT

A measurement pickup is provided offering a high measure of safety and having a measurement pickup housing, a sensor element arranged in the measurement pickup, at least one connection element closing the measurement pickup housing, and an excess-pressure protection device, especially a burst disk or a pressure relief valve, integrated in the connection element, which serves to effect a pressure equalization with an environment of the measurement pickup in the case of a pressure overload in the measurement pickup.

24 Claims, 6 Drawing Sheets

U.S. PATENT DOCUMENTS

| | | | |
|---|---|---|---|
| 4,716,770 A * | 1/1988 | Herzog | 73/861.24 |
| 4,850,213 A * | 7/1989 | Steinebrunner et al. | 73/290 V |
| 4,864,868 A * | 9/1989 | Khalifa | 73/861.24 |
| 5,052,230 A * | 10/1991 | Lang et al. | 73/861.28 |
| 5,131,279 A * | 7/1992 | Lang et al. | 73/861.27 |
| 5,363,341 A * | 11/1994 | Schwald et al. | 367/140 |
| 5,554,809 A * | 9/1996 | Tobita et al. | 73/700 |
| 5,725,024 A * | 3/1998 | Nimberger | 137/597 |
| 5,796,011 A * | 8/1998 | Keita et al. | 73/861.357 |
| 5,954,526 A * | 9/1999 | Smith | 439/136 |
| 6,236,322 B1 * | 5/2001 | Lopatin et al. | 340/612 |
| 6,279,401 B1 * | 8/2001 | Karas | 73/716 |
| 6,352,000 B1 * | 3/2002 | Getman et al. | 73/861.22 |
| 6,397,683 B1 * | 6/2002 | Hagenmeyer et al. | 73/861.18 |
| 6,918,303 B2 * | 7/2005 | Casimiro et al. | 73/706 |
| 7,051,751 B2 * | 5/2006 | Carroll | 137/68.23 |
| 2005/0017896 A1 | 1/2005 | Klofer et al. | |

FOREIGN PATENT DOCUMENTS

| | | |
|---|---|---|
| DE | 1 773 458 | 5/1968 |
| DE | 33 11 252 A1 | 10/1984 |
| DE | 91 05 261.0 | 8/1991 |
| DE | 41 11 118 A1 | 10/1992 |
| DE | 42 18 474 A1 | 12/1992 |
| DE | 43 31 314 C1 | 9/1994 |
| DE | 195 03 488 A1 | 8/1996 |
| DE | 195 23 234 A1 | 1/1997 |
| DE | 197 41 893 C1 | 3/1999 |
| DE | 200 04 195 U1 | 7/2000 |
| DE | 103 47 861 A1 | 4/2005 |
| DE | 10347861 | 4/2005 |
| EP | 0 662 204 B1 | 4/1998 |
| EP | 903651 A1 * | 3/1999 |
| EP | 0 0984 248 B1 | 3/2000 |
| EP | 984248 A1 * | 3/2000 |
| EP | 1008836 A1 * | 6/2000 |
| EP | 0 792 239 B1 | 10/2002 |
| FR | 2 273 991 | 1/1976 |

* cited by examiner

MEASUREMENT PICKUP

FIELD OF THE INVENTION

The invention relates to a measurement pickup having a measurement pickup housing, a sensor element arranged in the measurement pickup and at least one connection element closing the measurement pickup housing.

BACKGROUND OF THE INVENTION

Used in industrial process measurement technology are so-called field devices. These are on-site measuring devices for producing analog or digital measurement signals representing measured variables of a process. Field devices are used especially in connection with the automation of chemical or other kinds of processing plants. Examples of process measured variables include mass flow rate, fill, or limit, level, pressure and temperature. Field devices of this kind are described, for example, in EP-A 984 248, U.S. Pat. No. 3,878,725, U.S. Pat. No. 4,308,754, U.S. Pat. No. 4,468,971, U.S. Pat. No. 4,574,328, U.S. Pat. No. 4,594,584, U.S. Pat. No. 4,617,607, U.S. Pat. No. 4,716,770, U.S. Pat. No. 4,850,213, U.S. Pat. No. 5,052,230, U.S. Pat. No. 5,131,279, U.S. Pat. No. 5,363,341, U.S. Pat. No. 5,796,011, U.S. Pat. No. 6,236,322, U.S. Pat. No. 6,397,683 or WO-A 00 36 379.

For the registering of one or more measured variables of a process, the measuring device includes a suitable measurement pickup, which is, most often, a physical-electrical transducer, which is inserted into a wall of a relevant container, e.g. a pipeline or a tank, carrying e.g. a liquid, powdered, vaporous or gaseous, process medium. The transducer serves to produce at least one, especially electrical, measurement signal representing the measured variable of the process.

The measurement pickup is also electrically connected with an appropriate measuring and operating electronics—or, shorter, "measuring device electronics"—serving especially also for a further processing or evaluation of the at least one measurement signal. The measuring device electronics is arranged in most of such measuring devices in the immediate vicinity of the measurement pickup. Additionally, field devices of the described kind are mostly also connected with one another and/or with appropriate process control computers via a data-transmission system connected to the measuring device electronics. The measurement signals are transmitted via (4 to 20 mA)-current loops and/or via digital data bus. Serving as data transmission systems in such case are, especially serial, fieldbus systems, such as e.g. PROFIBUS-PA, FOUNDATION FIELDBUS, together with the corresponding transmission protocols. By means of the process control computers, the transmitted measurement signals can be processed further and visualized as corresponding measurement results e.g. on monitors and/or they can be converted into control signals for process actuators, such as e.g. magnetic valves, electromotors, etc.

For accommodating the measuring device electronics, process measuring devices of the described kind include an electronics housing, which, as proposed e.g. in U.S. Pat. No. 6,397,683 or WO-A 00 36 379, can be located remotely from the measuring device and connected with such only via a flexible cable. Usually, however, the measuring device electronics is accommodated in a corresponding electronics housing of the measuring device, which, as shown e.g. also in EP-A 903,651 or EP-A 1 008 836, is mounted directly on the measurement pickup via a connection element, usually in the form of a neck- or nozzle-shaped connection element or also in the form of a simple flange connection. Often, the electronics housing then serves also for accommodating some mechanical components of the measurement pickup, such as e.g. membrane-, rod- or sleeve-shaped deformation- or vibration-bodies deforming during operation under the influence of mechanical loads, as shown e.g. in EP-A 984 248, U.S. Pat. No. 4,594,584, U.S. Pat. No. 4,716,770 or U.S. Pat. No. 6,352,000. For the electrical connection of measuring and operating electronics to the measurement pickup, connection lines are provided, these being run through the connection element and being sectionally embedded by a sealing material, e.g. plastic and/or glass, usually filling the connection element, at least partially.

The advantage of a direct, especially also rigid, mechanical connection between electronics housing and measurement pickup is, above all, that, on-site, after installation of the measurement pickup, practically no further mounting steps are necessary for the attachment of the electronics housing.

Measuring devices of the described kind must, in industry, satisfy high safety standards, which are, as a rule, rigidly set nationally in corresponding safety regulations, in order that, both in normal operation and in the case of an occurring interruption, a high measure of safety is assured for persons and plant. An important aspect of this is to construct the housing such that it can be subjected safely both during normal operation, and during an interruption, to pressure, or gage pressure. Pressure, or pressure difference, measurement pickups must, for example, be able to withstand pressures up to two-times pick-up-specific, nominal pressure. The nominal pressure is an upper limit value for a pressure acting on the measurement pickup, for which the pressure, or pressure-difference, measurement pickup is designed. Components, such as, for example, connection elements, especially flanges, and screws, must even be able to withstand pressures up to three-times nominal pressure. At three-times nominal pressure, small leaks at sealing locations are, however, tolerable. As a rule, the components of the measurement pickups are, however, irreversibly damaged at a loading of three-times nominal pressure. Such irreversible damage occurs e.g. when components, such as e.g. flanges or screws, are strained beyond yield. The affected parts must then be replaced. In order to prevent this, it is usual that plants have safety valves or burst disks, which open in the case of an exceeding of a prescribed pressure and prevent further pressure increase. Basic requirements in this regard are provided e.g. in the Technical Rules for Pressurized Gases (TRG 250 and 254) and are used in the case of so-called unharmful gases, e.g. inert gases or carbon dioxide, as well as in the case of liquids.

Such an excess pressure protection apparatus placed in front of a measurement pickup in a plant is, however, not tuned to the requirements of the particular measurement pickup and often reacts too slowly to dynamic overloads. In the case of rapid pressure rises, irreversible damaging of the measurement pickup can, therefore, still occur, despite the interposed excess pressure protection apparatus. On top of this, defects can arise with regard to the installation of the interposed excess pressure protection apparatus, e.g. the protection apparatus is completely omitted, or, through inadvertence, an excess pressure protection apparatus is installed, which opens already at pressures below the nominal pressure, or does not open at pressures above three-times the nominal pressure.

Also in the case of flow measuring devices, there is, as a rule, the necessity of building the measurement pickup housing such that it can withstand pressure. In such case, the measurement pickup housing is a tubular jacket, in which the measuring tube extends. The medium, whose flow rate is to be registered, flows, during operation, through the measuring tube. In the case of magnetoinductive flow measuring devices, coils are provided at the measuring tube for producing a magnetic field in the interior of the measuring tube, this being accompanied by electrodes for sampling an induced voltage produced by a flow of a conductive medium through the magnetic field. In normal operation, no high pressures are present in the tubular jacket. However, in the case of a malfunction, e.g. in the case of damage to the measuring tube or to the supply and removal lines, pressure increases can occur in the tubular jacket. For, in such case, assuring an appropriate degree of safety, it is necessary to construct the tubular jacket to be pressure resistant. This is, however, associated with increased costs. Insertion of an excess pressure protection apparatus in front, such as is usual in pressure measurement technology, is not, as a rule, feasible, due to the way in which the flow measurement pickup is constructed. The above considerations are analogously true also for other types of flow measuring pickups, such as e.g. vortex, Coriolis, ultrasonic flow measuring devices or thermal flow meters. Also, in the case of a pressure resistant construction of the tubular jacket, especially in the case of malfunctions in which high and/or rapid pressure increases occur, it is possible to experience irreversible damage to components, such as tubular jacket, screws and flanges, which necessitates replacement of such components.

In the case of a pressure overload, it is, however, not only the measurement pickup itself which is in danger. There is also the danger, that the medium causing the pressure overload can escape uncontrollably. Exactly in large plants, where many measuring devices with measurement pickups are installed, there is frequently a much-branched system of cable conduits, via which the separate measuring and operating electronics are, as shown e.g. in WO-A 03/040851, connected to superordinated process control systems situated most often in remote control rooms. In such plants, especially gaseous and/or vaporous media can, in the case of a pressure overload, possibly reach through the connection element and the electronics housing into the widely branched cable conduit system and spread in the plant completely without control. While, in the vicinity of the measurement pickup, safety measures tailored to the media being used prevail, such is not compelled to be the case in remote areas. Such an uncontrolled escape of an, especially gaseous and/or vaporous medium thus represents a high safety risk. In the case of the measuring device disclosed in WO-A 03/040851, an alarm signal is produced in the case of such a malfunction. However, the forwarding of the medium into the control room can neither be prevented in this manner nor even near-term restrained.

SUMMARY OF THE INVENTION

It is an object of the invention to improve a measurement pickup, or measuring device, of the described kind in such a way that it offers a highest possible degree of safety also for remote control rooms.

To this end, the invention resides in a measurement pickup, especially a pressure pickup or a flow pickup installable into the course of a pipeline for flowing media, having a measurement pickup housing, a sensor element arranged in the measurement pickup, at least one connection element, especially one embodied as a neck and/or nozzle, fixed on the measurement pickup housing for a measuring and operating electronics electrically connectable with the sensor element, and an excess-pressure protection device arranged in the connection element, especially a burst disk or a pressure relief valve, which is in communication with a lumen of the measurement pickup housing and serves for effecting a pressure equalization with an environment of the measurement pickup in the case of a pressure overload in the measurement pickup. Additionally, the invention also resides in a measuring device, especially a measuring device in the form of a flow measuring device, pressure measuring device, fill level measuring device and/or fill level limit switch, containing such a measurement pickup and an electronics housing fixed, especially releasably, to the measurement pickup, for the measuring and operating electronics.

In a first embodiment of the invention, the burst disk is replaceable,

In a second embodiment of the invention, the measurement pickup is a pressure measurement pickup and the sensor element a pressure measurement cell. In a further development of this embodiment, there is provided in a flange a first measurement line connection, over which a pressure to be measured can be conveyed to the sensor element, and a hydraulic resistance of the first measurement line connection is greater than a hydraulic resistance of the opened, excess-pressure protection device. According to another further development of this embodiment of the invention, a throttle of selected hydraulic resistance is inserted into each first measurement line connection. Alternatively, or in supplementation thereof, a pressure supply line is connectable to the first measuring line connection, and the excess-pressure protection device is integrated in a second measuring line connection. Further, in the first measuring line connection a flow monitor can be provided, which closes the first measuring line connection in the case of an increased volume flow rate through the first measuring line connection.

In a third embodiment of the invention, the sensor element is electrically connectable through the connection element. According to a further development of this embodiment of the invention, the measurement pickup has a first seal, which seals an interior space of the connection element from an interior space of the measurement pickup, and a second seal, which seals the interior space of the connection element from components mountable thereon, with the excess-pressure device being arranged in the connection element between the first seal and the second seal.

In a fourth embodiment of the invention, the connection element has a neck- and/or nozzle-shape, and the excess-pressure protection device is so arranged in the connection element that the excess pressure in the measurement pickup housing is reduced by venting of excess medium laterally from the connection element.

In a fifth embodiment of the invention, the measurement pickup housing is a tubular jacket of a flow measuring device in which a measuring tube extends.

An advantage of the invention is that the excess-pressure protection device is arranged directly in a connection element of the measurement pickup. In this way, the excess-pressure protection device can be optimally matched to the details of the measurement pickup. An irreversible damaging of the components of the measurement pickup is, in this way, excluded, even in cases of malfunction.

A further advantage is that, in the case of a responding of the excess-pressure protection device, the medium causing the pressure overload escapes at an exactly defined location in the immediate vicinity of the measurement pickup.

BRIEF DESCRIPTION OF THE DRAWINGS

The invention and further advantages will now be explained in further detail on the basis of the figures of the drawing, in which three examples of embodiments are illustrated. Equal elements are provided in the figures with equal reference characters.

DESCRIPTION OF THE PREFERRED EMBODIMENTS

Figure 1:
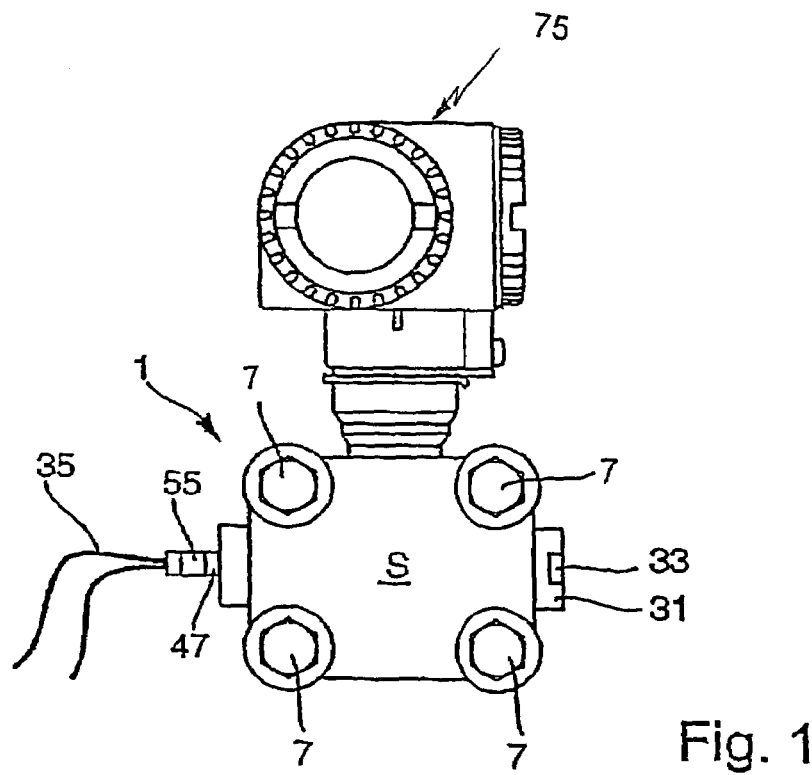
FIG. 1 shows a view of a pressure-difference transmitter with a measurement pickup of the invention.

FIG. 1 shows an example of an embodiment of a measuring device of the invention for process measurement technology. The device includes a measurement pickup housing 1 and an electronics housing 75 for a measuring and operating electronics (not shown) of the measuring device. The example of an embodiment shown in FIG. 1 is a pressure measuring device, e.g. a pressure-difference measuring device or an absolute pressure measuring device. Alternatively, however, the measuring device of the invention can also be a fill level measuring device working with electromagnetic microwaves or with ultrasonic waves, or a fill level limit switch or some other measuring device of process measurement technology installed as a probe in a wall of a container, especially a tank.

Figure 2:
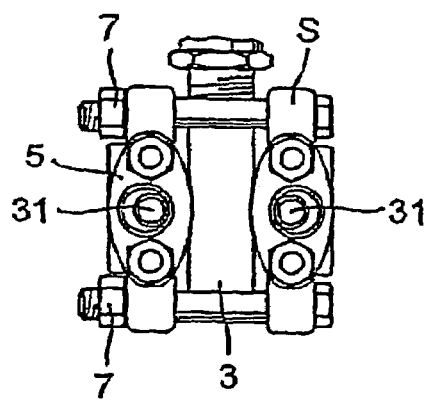
FIG. 2 shows a view of the measurement pickup housing and the connection elements of FIG. 1.
Figure 3:
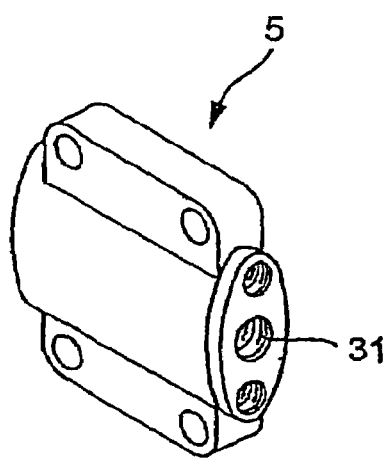
FIG. 3 shows a view of a connection element of the measurement pickup of FIG. 1.
Figure 4:
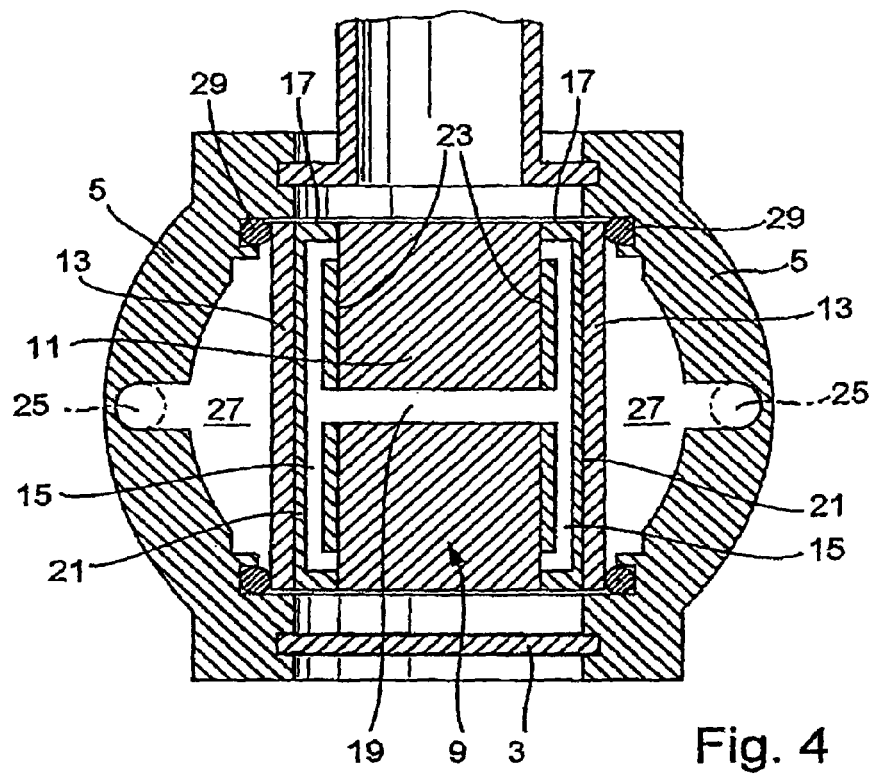
FIG. 4 shows a longitudinal section through the measurement pickup housing of FIG. 1 and a sensor element arranged therein.

The measurement pickup housing 1 includes a metal cylinder 3, which is closed on each end by a connection element 5. In the example of an embodiment shown here, the connection elements 5 are in the form of flanges. FIG. 2 shows a view of the measurement pickup housing 1 and the connection elements 5. FIG. 3 shows a view of a connection element 5. The cylinder 3 is clamped between the connection elements 5 by four bolts 7 passing through the connection elements 5 and forms an inner space of the measurement pickup housing 1. Inside the measurement pickup housing is a sensor element 9 for the pickup of a physical, measured variable, here a pressure difference. In the case of the illustrated example of an embodiment, the sensor element 9 is a pressure measuring cell, which is clamped inside the measurement pickup housing between the two connection elements 5. FIG. 4 shows a longitudinal section through the measurement pickup housing of FIG. 1. The pressure measuring cell is a capacitive, ceramic, pressure-difference measuring cell. The pressure-difference measuring cell includes an essentially fully cylindrical platform 11, on whose circular end faces are arranged, in each case, a membrane 13 spaced from the platform 11. The platform 11 and the membrane 13 are made of ceramic. The membranes 13 are connected pressure-tightly and gas-tightly at their edges by means of joints 17 with the platform 11, in each case, with the formation of a measuring chamber 15. The two measuring chambers 15 are connected together by a bore 19 passing through the platform. The two measuring chambers 15 and the bore 19 are filled with a pressure-transmitting liquid, which is as incompressible as possible, e.g. a silicone oil. The membranes 13 are pressure-sensitive, i.e. a pressure p acting on a membrane causes it to deflect from its rest position.

The pressure-difference measuring cell contains a transducer for converting the pressure-dependent deflection of the membranes 13 into an electrical, measured variable.

In the illustrated example of an embodiment of a capacitive pressure-difference sensor, the transducer includes, in each case an electrode 21 arranged on an inner side of each membrane 13 and at least one counterelectrode 23 arranged on an oppositely lying outer side of the platform 11 facing the respective membrane 13.

The capacitances of the capacitors formed by the electrodes 21 and the counterelectrodes 23 are determined by the deflections of the membranes 13 and are, consequently, a measure of the pressure-difference acting on the pressure-difference sensor.

The electrodes 21 are preferably connected to ground via the joints 17 and the counterelectrodes 23 are contacted through the platform 11 and connected to a measuring circuit (not shown), which converts the capacitances into an output signal dependent on the pressure difference and made available for a further evaluation and/or processing.

The two connection elements 5 are essentially panels of approximately square shape, which enclose the pressure-difference sensor in such a manner that the membranes 13 in each case face toward a square face of a connection element 5. Each connection element 5 has a continuous bore 25, through which, in each case, one of the two pressures, whose difference is to be measured, acts on one of the membranes. On their ends facing their respective membrane 13, the bores open into chambers 27 formed by hollows in the connection elements 5. Chambers 27 are bordered at their edges on the end faces of the connection elements 5 by support areas, against which the membranes 13 bear with an outer, pressure-insensitive edge, with interposition of at least one seal 29, e.g. an O-ring of an elastomer. Preferably, grooves are provided to receive the seals 29.

Connection elements 5 of conventional pressure-difference measurement pickups have currently, as standard features, a first measuring line connection and, situated oppositely thereto, a second measuring line connection identical to the first, and both designated by the reference numeral 31. These each open on a rectangular face of the flange 5 and lead directly to the bores 25, via which the measuring line connections 31 are placed in connection with their respective chambers 27.

In a measuring of a pressure-difference of gaseous media, the first measuring line connections 31, via which the pressure supply is effected, are arranged above. In each case oppositely lying, downwardly-directed, second measuring line connections 31 of the connection elements are sealed in conventional pressure-difference pickups. They can, in case of need, be used to release liquid condensed in the measurement pickup.

In a measuring of a pressure-difference of liquid media, the first measuring line connections 31 of each connection element 5, via which the pressure supply is effected, are arranged below. In each case oppositely lying, upwardly-directed, second measuring line connections are sealed in conventional pressure-difference pickups. They can, in case of need, be used e.g. to release air from the measurement pickup via an air-venting fitting screwed into the measuring line connection 31.

According to the invention, installed in the connection elements is an excess-pressure protection device 33, which communicates with a lumen of the measurement pickup housing and serves in the case of a pressure overload in the measurement pickup to effect a pressure equalization with an environment of the measurement pickup. Preferably, a pressure supply line 35 is connectable to each of the first measuring line connections 31 and the excess-pressure protection device 33 is integrated in the second measuring line connection 31.

The excess-pressure protection device 33 is preferably a burst disk 37 or a pressure relief valve.

Pressure relief valves are available commercially, which have an external thread which can be directly screwed into standard internally threaded bores provided in measuring line connections 31 of connection elements 5 of pressure-difference measurement pickups. Such pressure relief valves are frequently referenced as safety valves. They open automatically upon the exceeding of a valve-specific, predetermined pressure and self-close again, when the pressure acting on them falls below this predetermined pressure.

Since they are screwed in, they can be removed at any time, e.g. to vent air from, or for dewatering of, the measurement pickup, and then they can be subsequently reinstalled.

Figure 5:
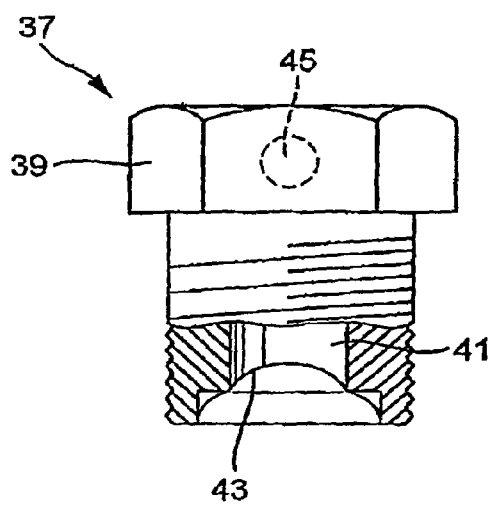
FIG. 5 shows a partially sectioned view of a burst disk.
Figure 6:
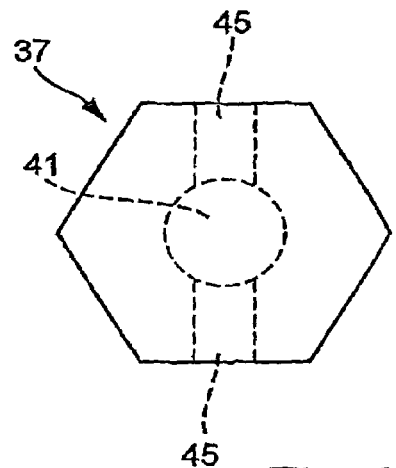
FIG. 6 shows a section through the burst disk at the level of the venting bores

Alternatively, a burst disk 37 can be used as the excess-pressure protection device 33. FIG. 5 shows a partially sectioned view of a burst disk 37. It has the form of a screw with a screw-head 39. Preferably, the burst disks 37 are screwed into standard bores of the measuring line connections 31 of the connection element 5. In the interior of the screw is an axial bore 41, which is open at an end of the screw facing away from the screw-head 39. This end is sealed by means of a membrane, or diaphragm, 43. Venting bores 45 are provided in the screw-head 39. FIG. 6 shows a section through the burst disk 37 at the level of the venting openings 45. These lead radially outwards from the axial bore 41 and provide a connection of the axial bore 41 to the environment of the measurement pickup. If a pressure acting on the membrane 43 exceeds a predetermined pressure, the membrane 43 is destroyed. A pressure equalization with the environment of the measurement pickup then occurs via the axial bore 41 and the venting bores 45.

The burst disk 37 is replaceable in an embodiment of the invention. In the case of the described example of an embodiment, this is done in simple manner, by unscrewing the burst disk 37 from the measuring line connection 31, e.g. following an above-described instance of overload, and replacing it with a new burst disc 37.

The predetermined pressure, at which the excess-pressure protection devices 33 open, is, for example, equal to twice the nominal pressure. As soon as a pressure acting on the excess-pressure device 33 rises to this predetermined pressure, the excess-pressure protection device 33 opens and the medium flows out. Following a sinking of the pressure below the predetermined pressure, the excess-pressure valve closes, or the burst disk 37 is replaced, as the case may be.

A mechanical damaging of the components of the measurement pickup is, in this way, prevented.

An advantage of the measurement pickup of the invention is that the excess-pressure protection devices 33 are arranged directly in the flanges 5 of the measurement pickup. They are direct components of the measurement pickup and can, thus, be matched optimally to the circumstances of the particular measurement pickup. As described on the basis of the example of an embodiment, the excess-pressure protection devices 33 can, in the case of pressure-difference measurement pickups, be installed directly in standard bores present in the connection elements. This offers the advantage that no extra effort is required and standard components can be used.

A further advantage is that no change, special installations or retrofittings are required on-site. Since the excess-pressure protection devices 33 are integral components of the measurement pickup, errors, such as e.g. an incorrect dimensioning or even a missing excess-pressure protection device, are precluded.

Preferably, the measurement pickup is so designed that a hydraulic resistance of the first measuring line connections, via which the pressures to be measured are suppliable to the sensor element, is greater than a hydraulic resistance of the opened excess-pressure protection device 33.

This can be achieved, for example, by an appropriate coordination of the geometric dimensions of the excess-pressure protection devices, the measuring line connections 31 and the pressure supply lines 35.

Figure 7:
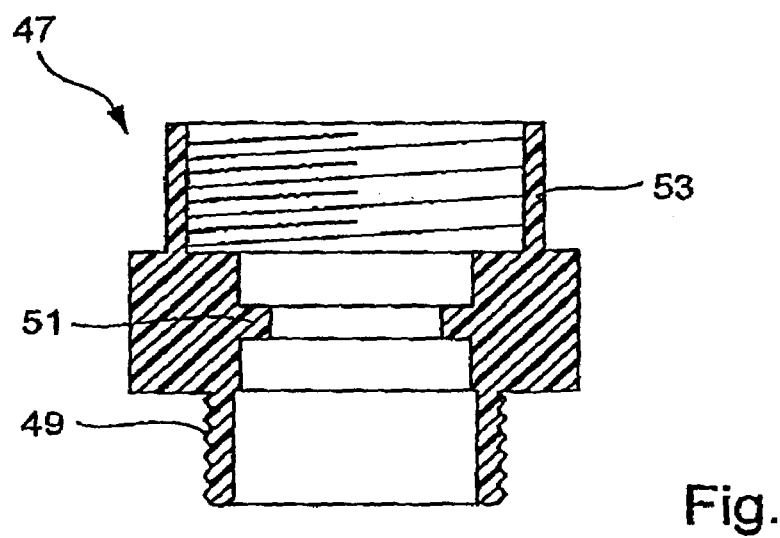
FIG. 7 shows a throttle.

Alternatively, a throttle 47 with appropriately selected hydraulic resistance can be installed into the first measuring line connections 31. FIG. 7 shows a longitudinal section of an example of an embodiment for a throttle 47. Throttle 47 is an essentially cylindrical, screw-in fitting, containing three sections. A first section is a cylinder 49 with an external thread, which can be screwed into the bore of the first measuring line connection 31. Thereon follows a second, likewise essentially hollow-cylindrical section, which has, internally, a radially inwardly and annularly extending shoulder 51. The shoulder narrows an inner dimension of the interior. The smaller this inner dimension, the greater is the hydraulic resistance of the throttle 47. Following on the second section is a third, hollow-cylindrical, internally threaded section 53. This section 53 is preferably embodied with the standardized dimensions for measuring line connections, so that the pressure supply line 35 can be directly connected to the throttle 47.

Because the hydraulic resistance of the measuring line connection 31, via which the pressures to be measured are suppliable to the sensor element 9, is greater than the hydraulic resistance of the opened excess-pressure protection device 33, it is assured, even in the case of extremely fast pressure increase, that the excess-pressure protection device 33 opens faster than a further pressure increase beyond the predetermined pressure can occur in the measurement pickup.

Preferably, in the first measuring line connections 31, via which the pressures to be measured are suppliable to the sensor element 9, a flow monitor 55 is provided. Flow monitors 55 are mechanical devices, which close the measuring line connection 31 in the case of an increased volume flow rate through the measuring line connection 31.

Figure 8:
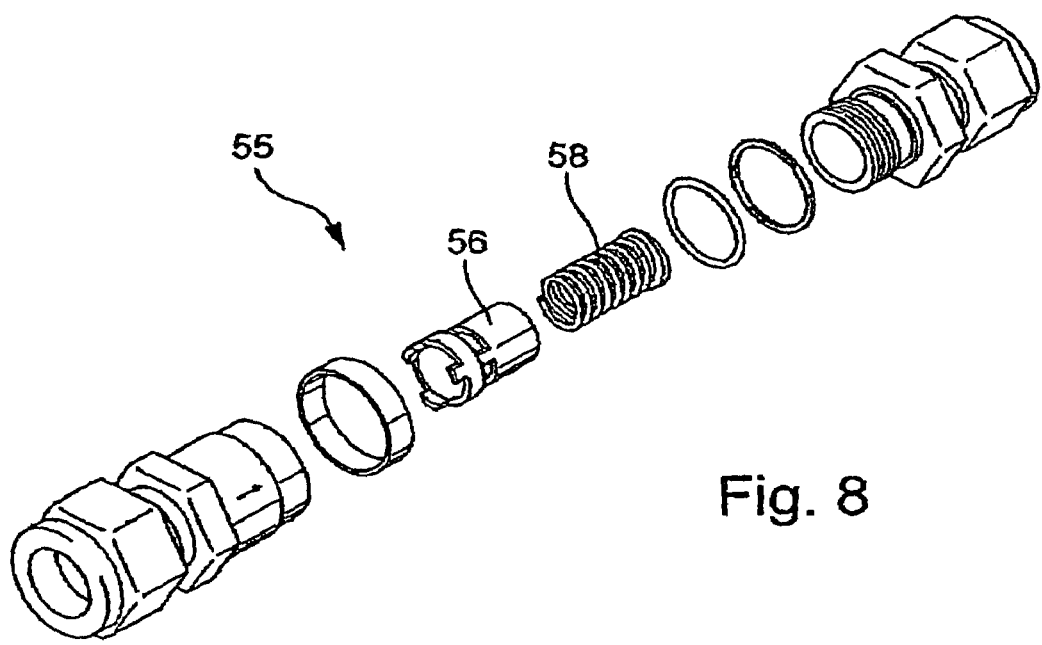
FIG. 8 shows a flow monitor.

Flow monitors 55 have, as a rule, a cylindrical chamber with an obliquely extending side-duct. In the case of an exceeding of a certain flow rate, the flow body is lifted and closes the measuring line connection 31. Flow monitors are available commercially, in which the flow body is held by its weight in its rest position until a certain pressure is reached. Since the manner of operation of this flow monitor is position-dependent, a vertical installation is required. Some commercial flow monitors are equipped with a return-spring, which holds the flow body in its rest position. In the case of these flow monitors, the return-force is supplied independently of weight, by the return-spring. They function, therefore, independently of their installed orientation. FIG. 8 shows an exploded view of an example of an embodiment of such a commercially available flow monitor of the firm Swagelok, including a flow body 56 and a return-spring 58.

For the case in which an excess-pressure protection device 33 opens, the flow monitor 55 in that line closes the associated first measuring line connection 31 and thus prevents escape of the medium into the environment of the measurement pickup.

A pressure-difference measurement pickup has been described on the basis of FIGS. 1 to 8. In analogous manner, the invention is, naturally, also useable in the case of pressure measurement pickups, which register only a pressure and not a difference between two pressures. These then, of course, have only one connection element, one pressure supply and one excess-pressure protection device.

Figure 9:
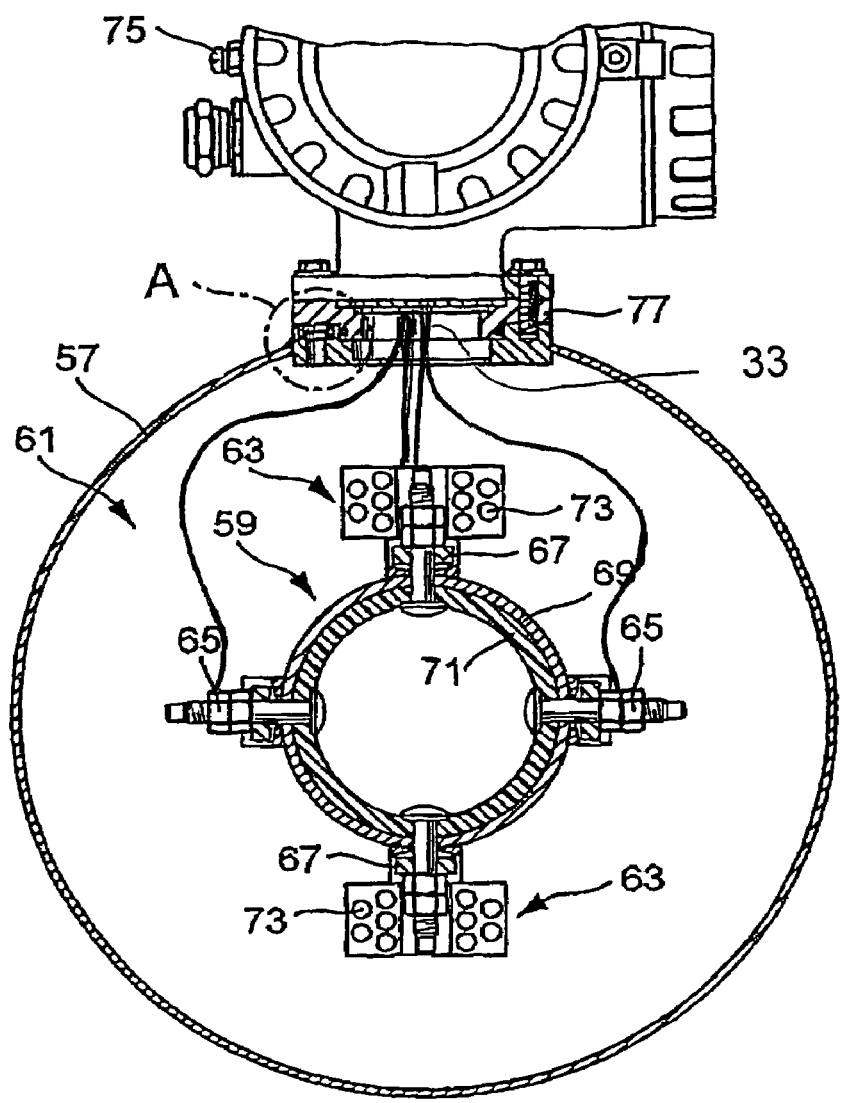
FIG. 9 shows a partially sectioned view of a flow measurement pickup including a connection element and a burst disk.
Figure 9:
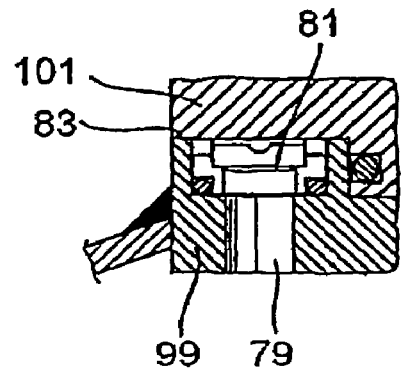

FIG. 9 shows a further example of an embodiment of a measurement pickup of the invention. In the case of the example of an embodiment illustrated in FIG. 9, such is a flow measurement pickup. Illustrated is a measurement pickup of a magneto-inductive flow measuring device. By means of a magneto-inductive flow measurement pickup, a volume flow rate of an electrically conductive liquid is measurable. The invention is, however, also quite applicable in connection with other flow measuring devices, such as e.g. vortex, Coriolis, and ultrasonic flow measuring devices or thermal flow meters.

The measurement pickup has a measurement pickup housing 57 in the form of a tubular jacket, in which a measuring tube 59 extends. During operation, the liquid flows through the measuring tube 59.

Arranged in the measurement pickup housing 57 is a sensor element 61. This includes an apparatus 63 for producing a magnetic field in the interior of the measuring tube 59.

The apparatus 63 is, for example, a magnetic circuit arrangement, as shown in FIG. 9. This includes electrodes 67, which extend laterally and form-fittingly through an outer support tube 69 of the measuring tube 59 into a liner 71. The electrodes are surrounded by coils 73. In operation, an appropriate measuring and operating electronics (also not shown here) coupled to the magnetic circuit arrangement and accommodated in the electronics housing 75 is used to produce a magnetic field of highest possible density, passing through the liquid perpendicularly to its flow direction and closing on itself essentially outside of the fluid. The measuring tube is made of non-ferromagnetic material. Due to the movement of the free charge carriers of the liquid in the magnetic field, there is produced in the measured volume, according to the magneto-hydrodynamic principle, an electric field of determined strength, which runs perpendicularly to the magnetic field and perpendicularly to the flow direction of the liquid.

The sensor element further includes two electrodes 65 spaced from one another in the direction of the electric field and serving to enable taping of the voltage induced in the liquid. The electrodes 65 are likewise connected to the mentioned measuring and operating electronics. The induced voltage is a measure for the volume flow rate through the measuring tube 59.

Provided on the measurement pickup housing 57 is a connection element 77, here in neck- and/or nozzle-shape, through which the sensor element is connectable to the associated measuring device electronics. The electronics housing 75 is here, as also in the case of the example of an embodiment shown in FIG. 1, secured by means of the connection element essentially directly on the measurement pickup housing 57. The connection element 77 thus is in communication both with the measurement pickup housing 57 and with the electronics housing 75. The electronics housing 75 serves, as already mentioned, to accommodate the measuring device electronics (also not shown in FIG. 9). Electrical connection lines lead through the connection element 77 into the measurement pickup housing 57 and can, for example, be appropriately embedded in sealing materials placed in the connection element, for example a synthetic material and/or glass.

In the connection element 77 is integrated, again, an excess-pressure protection device 33, especially a burst disk 85 or a pressure relief valve. Exactly as in the case of the example of an embodiment described above on the basis of FIGS. 1 to 8, the excess-pressure protection device 33 here serves for providing pressure equalization with an environment of the measurement pickup in the case of a pressure overload. This prevents a bursting of the tubular jacket and all the damage to persons and things potentially associated therewith.

The excess-pressure protection device 33 is arranged in a cavity in the connection element 77. The cavity includes a cylindrical bore 79, which opens into an interior of the measurement pickup housing 57. Additionally, it includes a chamber 81, which is connected to the cylindrical bore 79 on an end facing away from the measurement pickup housing 57. From the chamber 81, a gap 83 between the two halves of the connection element 77 leads radially outwards from the connection element 77. Through this gap 83, the chamber is connected with the environment of the measurement pickup. In the case of opened excess-pressure protection device 33, the pressure equalization with the environment occurs through this gap 83.

Figure 10:
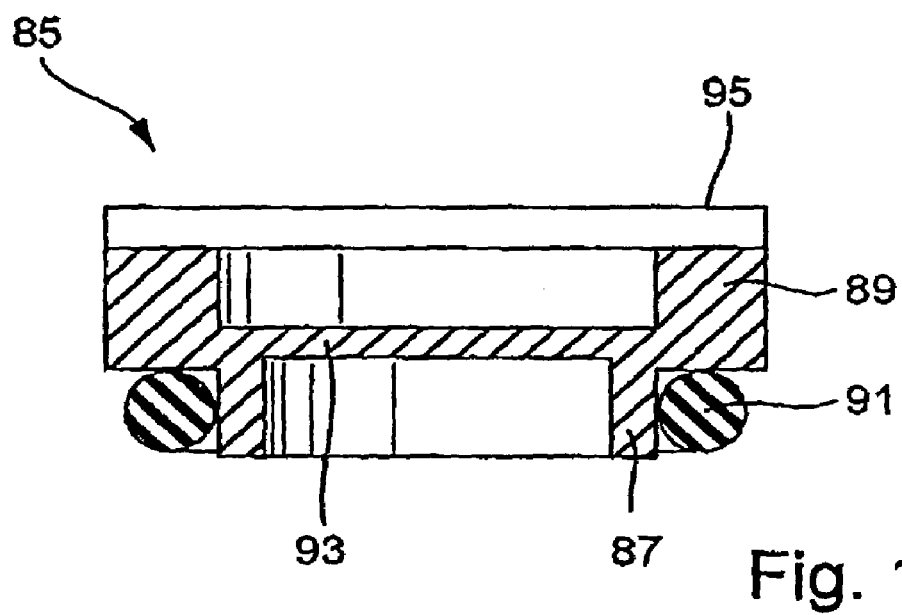
FIG. 10 shows a section through the burst disk of FIG. 8.

In the illustrated example of an embodiment, the excess-pressure protection device 33 is a burst disk 85. FIG. 10 shows a section through the burst disk 85. The burst disk has a hollow-cylindrical section 87, on which a further hollow-cylindrical section 89 follows. The latter has a greater outer diameter than the hollow-cylindrical section 87. There, where the two sections 87, 89 border one another, an annular bearing surface is created.

Figure 11:
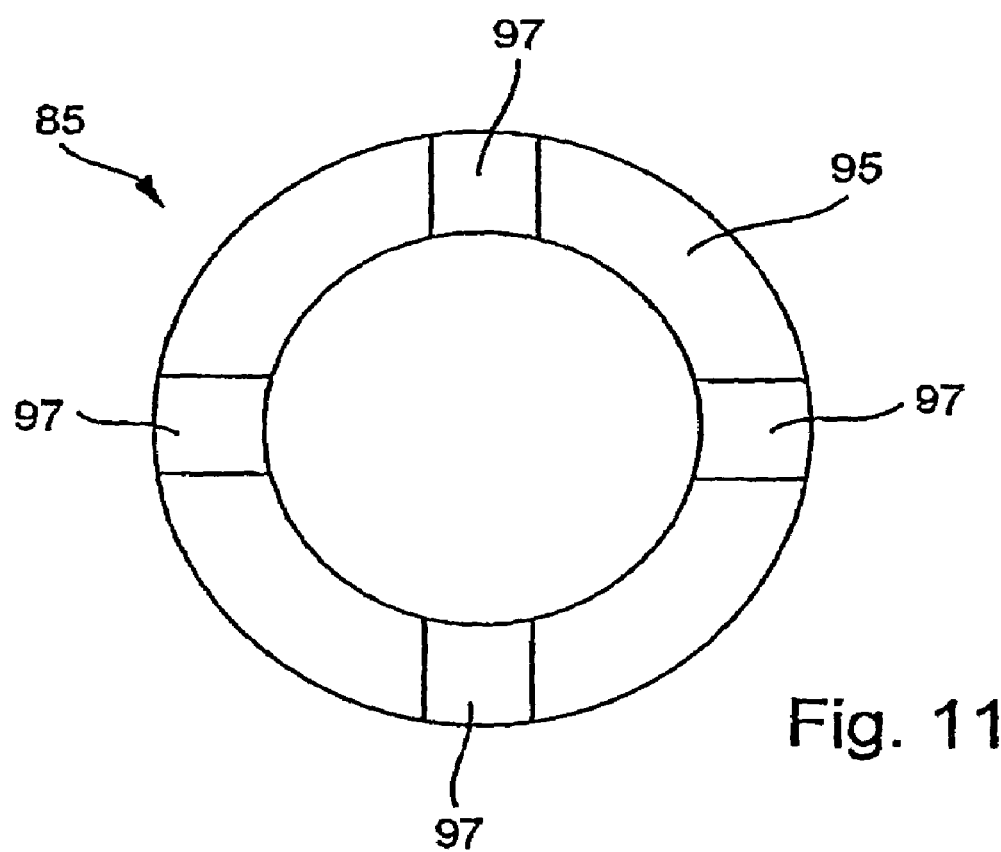
FIG. 11 shows a section through the burst disk of FIG. 9 at the level of venting openings provided in the burst disk.

Lying against this bearing surface is a seal 91, e.g. an O-ring of an elastomer. In the installed state, the seal 91 is clamped between the bearing surface and an annular support surface formed by the chamber 81 and bordering the bore 79. The interior of the burst disk 85 is sealed by circular disk-shaped membrane, or diaphragm, 93. The burst disk lies with an annular end face 95 against the internal wall of the chamber 81 directed towards the measurement pickup. The hollow-cylindrical section 89 has, on a side of the membrane 93 facing away from the measurement pickup, venting openings 97 leading radially outwards, located, in the installed state, at the level of the gap 83. FIG. 11 shows a view of the end face 95 of the burst disk 85 facing, in the installed state, away from the measurement pickup. The venting openings 97 are, in the illustrated example of an embodiment, grooves, which are open toward this end face 95.

The connection element 77 is made of metal, e.g. a steel or a high grade steel. The burst disk 85 is made preferably of a brittle plastic, e.g. of polypropylene ethylene (PPE).

If a pressure acting on the membrane 93 exceeds a predetermined pressure, the membrane 93 is destroyed and opens the path through the burst disk 85 to the venting openings 97. From there, a pressure equalization with the environment of the measurement pickup occurs through the gap 83.

The burst disk 85 is preferably replaceable. In the case of the described example of an embodiment, the connection element 77 is composed, for this purpose, of two essentially annular elements 99, 101, which are assembled together by screw-connection. In one of the elements 99 are located the bore 79 and the chamber 81. Chamber 81 is closed on its side far from the measurement pickup by the other element 101.

While it can be required that the measurement pickup housing 57 be pressure-tight in commercial flow measurement pickups for reasons of safety, this cost-intensive measure can be avoided in the case of the measurement pickup of the invention.

In normal operation, the interior of the measurement pickup housing 57 is not under pressure in flow measurement pickups. In normal operation, a pressure-tight embodiment of the measurement pickup housing 57 is not needed in flow measurement pickups. In the case of a malfunction, e.g. in the case of damage to the measuring tube 59, a pressure increase can occur in the interior of the measurement pickup housing 57. If this pressure exceeds a predetermined pressure, then the excess-pressure protection device 33 opens. A pressure equalization with the environment takes place, so that a further pressure increase beyond the predetermined pressure cannot occur. A bursting of the measurement pickup housing 57 is, in this way, excluded.

The predetermined pressure is determined in the case of the described example of an embodiment by the burst strength of the membrane 93. This is adjustable by the thickness and material of the membrane 93. The predetermined pressure can, consequently, be optimally matched to the circumstances of the measurement pickup, e.g. a mechanical load bearing ability of the measurement pickup housing 57.

Figure 12:
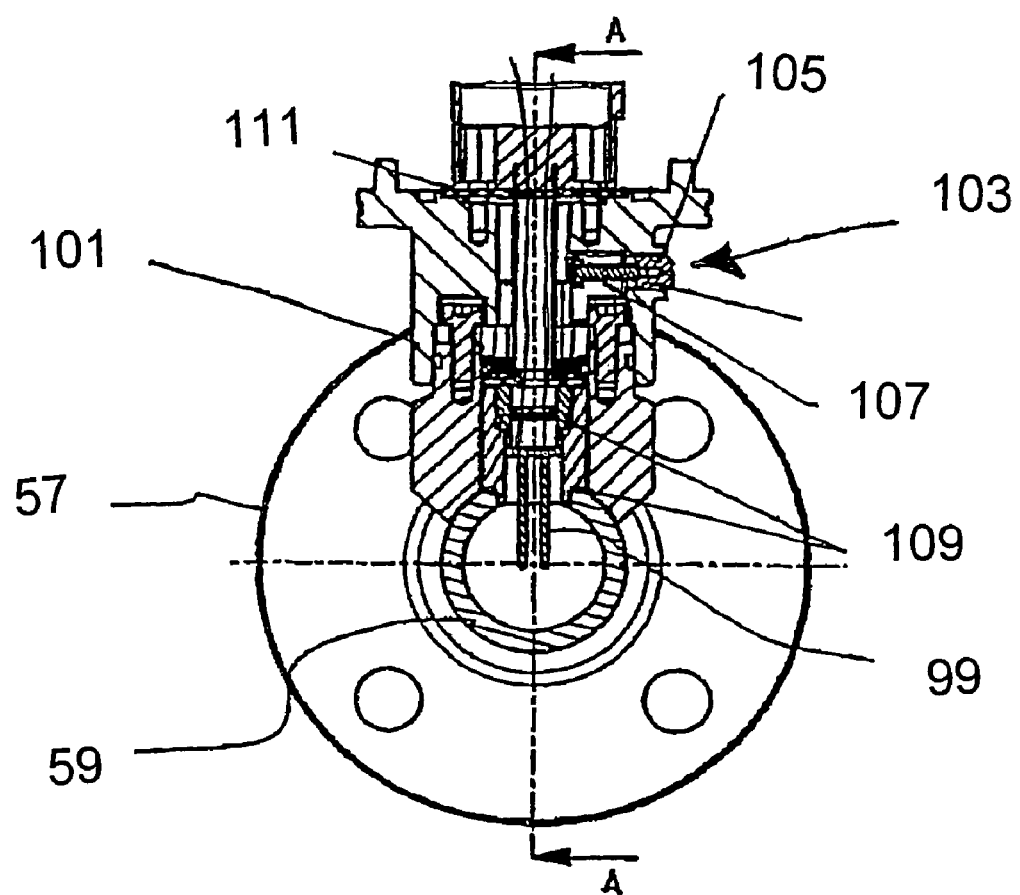
FIG. 12 shows a partially sectioned view of a flow measurement pickup having a connection element with two seals.

FIG. 12 shows a further example of an embodiment of a flow measurement pickup. Also in this instance, the measurement pickup housing 57 is a tubular jacket in which a measuring tube 59 extends. A sensor element 99 is provided, which protrudes, in the example of an embodiment selected here, into the measuring tube 59. In such case, the above-named principles of flow measurement can be used. Additionally provided is a connection element 101, which closes the measurement pickup housing 57 and in which an excess-pressure protection device 103 is integrated, which serves, in the case of a pressure overload in the measurement pickup, to bring about a pressure equalization with an environment of the measurement pickup. Suitable choices for excess-pressure protection device 103 are e.g. an pressure relief valve or a burst disk. In the illustrated example of an embodiment, a pressure relief valve is provided, in which a plug 105 seals a bore through an outer wall of the connection element 101 and is fixed there by means of a screw 107 seated against a tensioning spring. If the pressure in the interior of the connection element 101 exceeds a predetermined value, then the excess-pressure protection device 103 responds and a pressure equalization occurs through the bore.

The sensor element 99 is electrically connectable through the connection element 101. Exactly as in the case of the example of an embodiment illustrated in FIG. 9, here in FIG. 12 also, a housing (not shown) can, for example, be mounted on the connection element 101 to accommodate suitable electronics, or, instead, the connection element 101 can be used purely as a conduit and be connected to further connection lines.

Preferably, two seals 109, 111 are provided, of which a first seal 109 seals an interior of the connection element against an interior of the measurement pickup, and of which a second seal 111 seals the interior of the connection element 101 relative to components mounted thereon, i.e. the above-mentioned housing or connection lines. The excess-pressure device 103 is arranged in the connection element 101 between the first and the second seals 109, 111. This feature offers the advantage that a penetrating of a medium causing the excess pressure into components connected to the connection element 101 essentially no longer can occur. In normal operation, the interior of the connection element 101 is sealed by the first seal 109. Only after this seal 109 fails can a medium get into the interior of the connection element, where it then effects a pressure increase, which triggers the excess-pressure protection device 103. A pressure equalization with the immediate environment of the connection element 101 and the measurement pickup takes place, while the components connectable to the connection element 101 are protected by the second seal 111. In this way, it is prevented that the medium can spread uncontrollably via components connected to the connection element 101 and possibly reach areas in which no safety measures were effected.

Due to its very safe construction, the measuring device of the invention can be used in almost all areas of industrial measuring and automation technology. Equally, the invention can also be used directly for measuring devices based on other principles of measurement.

The invention claimed is:

1. A measurement pickup, comprising:
   a measurement pickup housing;
   a sensor element arranged in the measurement pickup housing;
   at least one connection element fixed to said measurement pickup housing; and
   an excess-pressure protection device, which includes a burst disk, arranged in said at least one connection element, wherein:
   said sensor element is electrically connectable through said at least one connection element, and
   said excess-pressure protection device communicates with a lumen of said measurement pickup housing and serving to effect a pressure equalization with an environment of the measurement pickup in the case of a pressure overload in the measurement pickup.

2. The measurement pickup as claimed in claim 1, wherein:
   said burst disk is replaceable.

3. The measurement pickup as claimed in claim 1, wherein:
   the measurement pickup is a pressure measuring pickup and said sensor element is a pressure measuring cell.

4. The measurement pickup as claimed in claim 3, wherein:
   in each connection element a first measuring line connection is provided, via which a pressure to be measured can be supplied to said sensor element; and
   a hydraulic resistance of said first measuring line connection is greater than a hydraulic resistance of the opened excess-pressure protection device.

5. The measurement pickup as claimed in claim 4, further comprising:
   a throttle of selected hydraulic resistance inserted into said first measuring line connection.

6. The measurement pickup as claimed in claim 4, further comprising:
a second measuring line connection; and
a pressure supply line connectable to said first measuring line connection,
wherein:
said excess-pressure protection device is integrated into said second measuring line connection.

7. The measurement pickup as claimed in claim 4, wherein:
in said first measuring line connection, a flow monitor is provided, which closes said first measuring line connection in the case of an increased volume flow rate through said first measuring line connection.

8. The measurement pickup as claimed in claim 1, further comprising:
a first seal, which seals an interior of said at least one connection element relative to an interior of the measurement pickup,
a second seal, which seals the interior of said at least one connection element relative to components mounted thereon, and
said excess-pressure protection device is arranged in said at least one connection element between said first and second seals.

9. The measurement pickup as claimed in claim 1, wherein:
said measurement pickup housing comprises a tubular jacket of a flow measurement pickup, in which a measuring tube extends.

10. The measurement pickup as claimed in claim 1, wherein:
said at least one connection element is in neck form, and
said excess-pressure protection device is so arranged in, said at least one connection element that the pressure overload in said measurement pickup housing is brought down by venting of excess medium laterally from said at least one connection element.

11. The measurement pickup as claimed in claim 1, wherein:
said at least one connection element is in nozzle form, and
said excess-pressure protection device is so arranged in, said at least one connection element that the pressure overload in said measurement pickup housing is brought down by venting of excess medium laterally from said at least one connection element.

12. A measuring device, comprising:
a measurement pickup including a measurement pickup housing, a sensor element, at least one connection element fixed to said measurement pickup housing, an excess-pressure protection device including a burst disk arranged in said at least one connection element; and
an electronics housing for accommodating measuring and operating electronics, said electronics housing being fixed, to said measurement pickup by means of said at least one connection element.

13. The measuring device as claimed in claim 12, wherein:
electrical connecting lines lead through said connecting element.

14. A measuring device comprising:
a measurement pickup including a measurement pickup housing and a sensor element arranged in said measurement pickup housing;
measuring and operating electronics;
an electronics housing accommodating said measuring and operating electronics;
at least one connection element connected with said measurement pickup housing and with said electronics housing; and
an excess-pressure protection device for effecting a pressure equalization with an environment of the measurement pickup in the case of a pressure overload in the measurement pickup, wherein:
said excess-pressure protection device is arranged in said at least one connection element, and said excess-pressure protection communicates with a lumen of said measurement pickup housing.

15. The measuring device as claimed in claim 14, wherein:
electrical connecting lines lead through said connecting element.

16. The measuring device as claimed in claim 15, wherein:
electrical connecting lines are embedded in sealing material placed in said connecting element.

17. The measuring device as claimed in claim 16, wherein:
the sealing material is a synthetic material.

18. The measuring device as claimed in claim 16, wherein:
the sealing material is glass.

19. The measuring device as claimed in claim 14, wherein:
the sensor element includes a measuring tube.

20. The measuring device as claimed in claim 19, wherein:
the measuring tube extends in said pickup housing.

21. The measuring device as claimed in claim 19, wherein:
said sensor element includes two electrodes connected with said measuring and operating electronics.

22. The measuring device as claimed in claim 19, wherein:
in operation, liquid flows through said measuring tube.

23. A measurement pickup comprising:
a measurement pickup housing:
a sensor element arranged in the measurement pickup housing:
at least one connection element fixed to said measurement pickup housing:
and an excess-pressure protection device, which includes a burst disk, arranged in said at lest one connection element,
wherein:
electrical connecting lines lead through said connecting element, and
said excess-pressure protection device communicates with a lumen of said measurement pickup housing and serving to effect a pressure equalization with an environment of the measurement pickup in the case of a pressure overload in the measurement pickup.

24. A measuring device, comprising:
a measurement pickup including a measurement pickup housing, a sensor element, at least one connection element fixed to said measurement pickup housing, an excess-pressure protection device including a pressure relief valve arranged in said at least one connection element; and
an electronics housing for accommodating measuring and operating electronics, said electronics housing being fixed to said measurement pickup by means of said at least one connection element.

* * * * *